United States Patent [19]

Woodring et al.

[11] Patent Number: 4,886,554
[45] Date of Patent: Dec. 12, 1989

[54] SOLAR ROOFING ASSEMBLY

[75] Inventors: William J. Woodring, Bound Brook; Charles J. Horner, Jr., Piscataway, both of N.J.

[73] Assignee: GAF Corporation, Wayne, N.J.

[21] Appl. No.: 250,588

[22] Filed: Sep. 29, 1988

[51] Int. Cl.$^4$ .................... H02N 6/00; H01L 25/02
[52] U.S. Cl. ........................ 136/244; 52/173 R; 136/291
[58] Field of Search ............ 136/244, 291; 52/173 R

[56] References Cited

U.S. PATENT DOCUMENTS 4,674,244 6/1987 Francovitch .................. 52/173 R

Primary Examiner—Aaron Weisstuch
Attorney, Agent, or Firm—Richard T. Laughlin; Anthony Lagani, Jr.; Joshua J. Ward

[57] ABSTRACT

A solar roofing assembly is provided including a roofing membrane, a plurality of insulation blocks disposed as a layer on top of the roofing membrane, a plurality of pavers disposed as a layer on top of the plurality of insulation blocks, and a plurality of photovoltaic cells, each supported on a respective paver. In a second embodiment, each paver has a respective photovoltaic cell bonded to the top surface of the paver and has a respective insulation block bonded to the bottom surface of the paver forming a shop assembled, three-layer unit. The insulation block is also tapered with one side edge being thicker than an opposite side edge so that rain water will run off the top surface of the photovoltaic cell. The three-layer paver units are arranged on top of the roofing membrane, so that the top surfaces of the photovoltaic cells face south or in the direction of increased sun exposure. The insulation blocks have interlocking side surfaces.

The joints between the pavers and the insulation blocks permit drainage therethrough of rain water for flow of rain water over the top of the roofing membrane. A method of manufacture is provided, wherein three-layer units of insulation block, paver and photovoltaic cell are made in the shop, and wherein the three-layer units are installed in the field over a field-installed roofing membrane.

10 Claims, 1 Drawing Sheet

SOLAR ROOFING ASSEMBLY

The invention generally relates to a solar roofing assembly, and in particular the invention relates to a solar roofing assembly having a roofing membrane and pavers with photovoltaic cells.

BACKGROUND OF THE INVENTION

A prior art solar roofing assembly is shown in U.S. Pat. No. 4,189,881, issued Feb. 26, 1980. This prior art assembly includes a plurality of longitudinally extending pans having parallel seams, a plurality of parallel battens respectively covering the seams, a plurality of photovoltaic cells disposed on the pans, and a plurality of conductors disposed respectively under the battens.

A related publication is the publication entitled "Photovoltaic Roofing Tiles as Low Cost Solar Energy System" Proceedings, 5th E.C. Photovoltaic Solary Energy Conference, Athens, Greece, October 1981, Reidel Publishing Company, 1984, pages 570–574.

Related patents include U.S. Pat. Nos. 3,769,091, issued Oct. 30, 1973, 4,040,867, issued Aug. 9, 1977, and 4,321,416 issued Mar. 23, 1982.

One problem with the above prior art roofing assembly is that it is not suitable for use on a flat roof due to water leakage through the seams.

SUMMARY OF THE INVENTION

According to the present invention, a solar roofing assembly is provided. The solar roofing assembly includes a roofing membrane, a plurality of insulation blocks disposed on top of the roofing membrane, a plurality of pavers disposed on top of the plurality of insulation blocks, and a plurality of photovoltaic cells which are respectively mounted on the plurality of pavers. The photovoltaic cells can be of such a construction that they can also serve as the pavers.

By using such solar roofing assembly, which has a roofing membrane that is a continuous waterproof membrane, and which has insulation blocks and pavers with solar cells, the problem of water leakage is avoided.

The foregoing and other objects, features and advantages will be apparent from the following description of the preferred embodiment of the invention as illustrated in the accompanying drawings.

DESCRIPTION OF THE PREFERRED EMBODIMENTS

Figure 1:
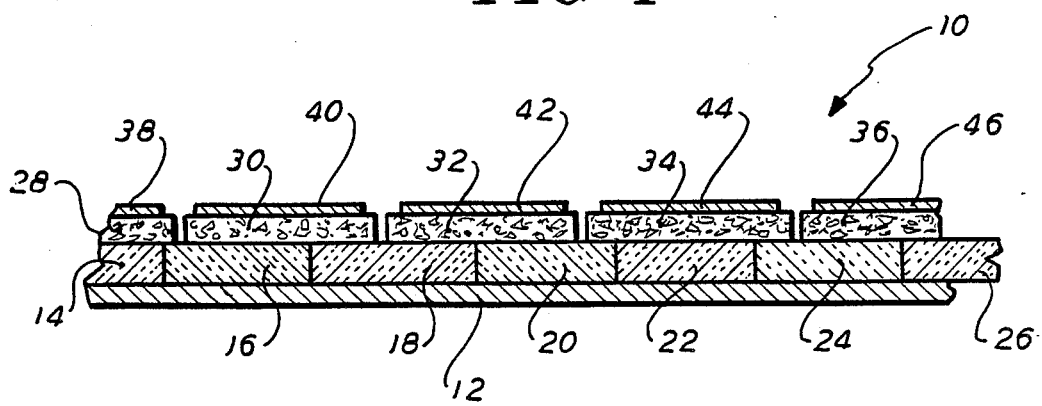
FIG. 1 is a section view of a solar roofing assembly according to the invention.

As shown in FIG. 1, a solar roofing assembly 10 is provided. Assembly 10 includes a roofing membrane 12, a plurality of insulation blocks 14, 16, 18, 20, 22, 24, 26, which are disposed on top of the membrane 12, and a plurality of pavers 28, 30, 32, 34, 36, which are disposed on top of the plurality of insulation blocks 14, 16, 18, 20, 22, 24, 26. The insulation blocks can be combined with the pavers as a single unit. Assembly 10 also includes a plurality of photovoltaic cells 38, 40, 42, 44, 46, which are respectively disposed on top of the plurality of pavers 28, 30, 32, 34, 36 and integral therewith, or fixedly connected thereto.

Membrane 12 is supported on a conventional roof framing (not shown). Cells 38, 40, 42, 44, 46 are connected to conventional conductors (not shown). Each of the pavers 28, 30, 32, 34, 36 has a length of a conventional paver. Each of the cells 38, 40, 42, 44, 46 has at least one photovoltaic unit and is arranged in an array of cells.

Figure 2:
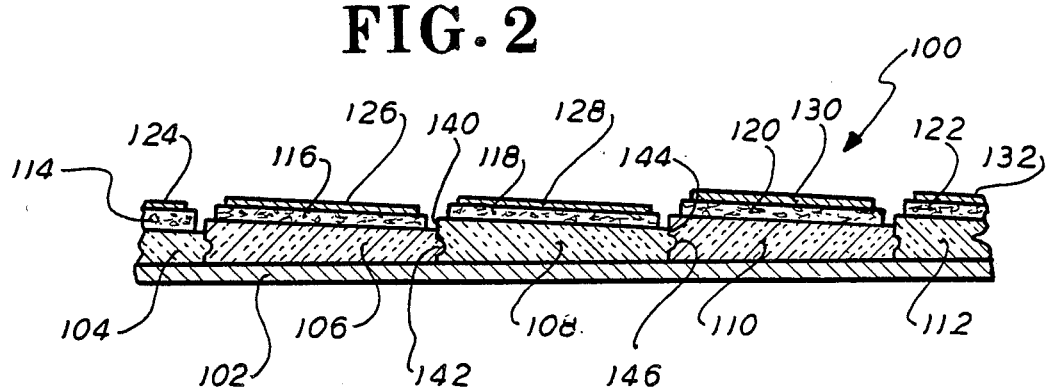
FIG. 2 is a section view of a second embodiment of a solar roofing assembly according to the invention.

As shown in FIG. 2, a second embodiment of a solar roofing assembly 100 is provided. Assembly 100 includes a roofing membrane 102 and a plurality of tapered, interlocking insulation blocks 104, 106, 108, 110, 112. Assembly 100 also includes a plurality of pavers 114, 116, 118, 120, 122, which have respective photovoltaic cells 124, 126, 128, 130, 132, which are integral therewith.

Figure 3:
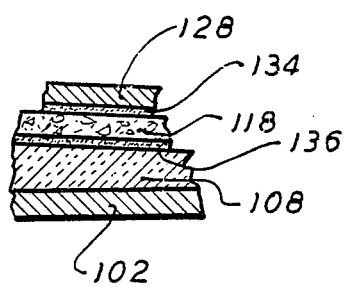
FIG. 3 is an enlarged portion of FIG. 2.

As shown in FIG. 3, paver 118, which is identical in construction to pavers 114, 116, 120, 122, has a top adhesive layer 134 for bonding or laminating cell 128 thereto in the shop. However, any system can be used for attaching the cells 128 to the pavers. Paver 118 also has a bottom adhesive layer 136 for laminating insulation block 108 thereto in the shop.

Membrane 102 is attached to the roof by conventional methods. Insulation blocks 104, 106, 108, 110 and 112 are loose laid on membrane 102. Adhesive layers 134, and 136 as shown in FIGS. 2 and 3, have exaggerated thicknesses for ease of illustration.

In the manufacture of assembly 100, photovoltaic cells 124, 126, 128, 130, 132, are added to, bonded to or otherwise attached to, respective pavers 114, 116, 118, 120, 122 in the shop or manufacturing plant.

Insulation blocks 104, 106, 108, 110, 112 are preferably tapered, that is, one longitudinal edge is substantially thicker than the opposite longitudinal edge. The integral subassemblies of insulation block and paver and photovoltaic cell, are arranged in the field in an efficient way, with the top surfaces of the photovoltaic cells facing toward the south, or in the direction of the most sun exposure. With this construction, rain water will run off the top surfaces of the photovoltaic cells 124, 126, 128, 130, 132.

Such action results in a natural, non-laborious, non-mechanical cleaning of the top surfaces of the photovoltaic cells. Rain water will drain between the integral subassemblies, that is, through the joints between the pavers, 114, 116, 118, 120, 122, and through the joints between the insulation blocks 104, 106, 108, 110, 112. The rain water will also drain over the top surface of roofing membrane 102.

Insulation block 108, which is identical to blocks 104, 106, 108, 110, 112, preferably has a left side surface 140 with a groove 142, and has a right side surface 144 with a projection 146. In this way, interlocking joints are formed between insulation blocks 104, 106, 108, 110, 112 for better resistance to wind uplift.

The preferred method of manufacture of solar roofing assembly 100 is indicated hereafter. In FIG. 3, a typical paver 118 is bonded or otherwise attached on its top surface to a typical photovoltaic cell 128, and is bonded on its bottom surface to a tapered insulation block 108 in the shop, before shipment to the field or site of construction, thereby forming a shop-assembled three-layer paver subassembly or unit. In the field, the roofing membrane 102 is installed. Then, the shop-assembled paver subassembly is installed as a layer over the roofing membrane. When installing the shop-assembled paver units in the field, the joints between the units are arranged in parallel straight lines.

Such joint lines are arranged normal to the direction of maximum sun exposure. The top surfaces of the shop-assembled paver units are also arranged to face in the direction of maximum sun exposure.

The advantages of assembly 10 and assembly 100 are indicated hereafter.

1. Solar roofing assembly 10, 100, which can be used on a flat roof, such as a commercial type, flat roof, minimizes water leakage through the roof.

2. Inclined photovoltaic cells 124, 126, 128, 130, 132 operate at a relatively high efficiency, due to their top surfaces being close to a plane normal to the sun rays.

3. Interlocked insulation blocks 104, 106, 108, 110, 112 prevent dislodging of individual blocks, because each block is held in place by its adjoining blocks.

4. The cost of installation of assembly 100 is minimized by using the shop-assembled integral block, which includes upper photovoltaic cell 128, middle paver 118, and lower insulation block 108.

While the invention has been described in its preferred embodiments, it is to be understood that the words which have been used are words of description rather than limitation and that changes may be made within the purview of the appended claims without departing from the true scope and spirit of the invention in its broader aspects.

For example, pavers 28, 30, 32, 34, 36, in FIG. 1, can have interlocking joints for joining together the pavers in an interlocked planar structure.

As another example, instead of a three-layer integral unit, a two-layer integral unit or even a single unit, which includes only the paver 118 and photovoltaic cell 128 or the combination, can be made in the shop, in the method of manufacture of assembly 100.

What is claimed is:

1. A solar roofing assembly comprising:
   a roofing membrane;
   a plurality of insulation blocks disposed as a layer on top of the roofing membrane;
   a plurality of pavers disposed as a layer on top of the plurality of insulation blocks; and
   a plurality of photovoltaic cells disposed as a layer on top of the plurality of pavers.

2. The assembly of claim 1, wherein each paver has a respective photovoltaic cell mounted on top of the paver.

3. The assembly of claim 2, wherein each pair of pavers with adjoining side surfaces has a joint disposed between the surfaces for water drainage, and each pair of insulation blocks with adjoining side surfaces has a joint disposed between the surfaces for water drainage.

4. The assembly of claim 3, wherein each insulation block has a respective paver positioned on top of the insulation block.

5. The assembly of claim 4, wherein each paver has a top surface which is bonded to its respective photovoltaic cell, forming a two-layer integral block.

6. The assembly of claim 5, wherein each paver has a bottom surface which is bonded to its respective insulation block, forming a three-layer integral block.

7. The assembly of claim 6, wherein each insulation block is a tapered insulation block, and the photovoltaic cell disposed above the insulation block has a top surface which can be installed so as to face in a direction of increased sun exposure.

8. The method of making a solar roofing assembly including:
   shop assembling a paver with a respective photovoltaic cell bonded to a top surface of the paver and a tapered insulating block bonded to a bottom surface of the paver forming a three-layer paver unit; installing in the field a roofing membrane; installing in the field the shop-assembled three-layer paver units as a layer on top of the roofing membrane.

9. The method of claim 8, including positioning the three-layer paver units in the field in substantially straight lines with their photovoltaic cells facing in a direction of maximum sun exposure.

10. A solar roofing assembly comprising:
    a roofing membrane of substantially watertight construction;
    a plurality of pavers disposed as a layer above the roofing membrane; and
    a plurality of photovoltaic cells respectively disposed on top of the plurality of pavers.

* * * * *